US010427222B2

(12) United States Patent
Evatt et al.

(10) Patent No.: US 10,427,222 B2
(45) Date of Patent: Oct. 1, 2019

(54) POCKET HOLE JIG

(71) Applicant: TTI (MACAO COMMERCIAL OFFSHORE) LIMITED, Macau (MO)

(72) Inventors: Thomas Evatt, Six Mile, SC (US); Clinton C. Thackery, Clemson, SC (US); Richard M. Davidian, Pickens, SC (US); Drew A. Dahill, Pendleton, SC (US); Jacob F. Creasman, Anderson, SC (US); Harrison S. McSpadden, Greenville, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 0 days.

(21) Appl. No.: 15/884,564

(22) Filed: Jan. 31, 2018

(65) Prior Publication Data

US 2018/0214960 A1    Aug. 2, 2018

Related U.S. Application Data

(60) Provisional application No. 62/453,089, filed on Feb. 1, 2017.

(51) Int. Cl.
*B23B 47/28* (2006.01)

(52) U.S. Cl.
CPC .......... *B23B 47/28* (2013.01); *B23B 47/287* (2013.01); *B23B 47/288* (2013.01); *B23B 2247/10* (2013.01); *B23B 2260/004* (2013.01); *B23B 2260/088* (2013.01); *B23B 2260/10* (2013.01); *Y10T 408/568* (2015.01)

(58) Field of Classification Search
CPC . Y10T 408/567; Y10T 408/569; B23B 47/28; B23B 47/287; B23B 47/288; B23B 2247/10
See application file for complete search history.

(56) References Cited

U.S. PATENT DOCUMENTS

| 2,836,087 A | * | 5/1958 | Ehresmann | ........... B23B 47/288 408/115 R |
| 3,548,686 A | * | 12/1970 | Marks | ........................ B27C 3/04 408/13 |
| 4,421,442 A | * | 12/1983 | Lindblad | ............... B23B 47/288 408/108 |
| 4,752,162 A | * | 6/1988 | Groh | ..................... B23B 47/288 33/638 |
| 4,770,297 A | * | 9/1988 | Chang | .................... B65D 85/28 206/379 |
| 5,299,896 A | | 4/1994 | Ferri | |

(Continued)

FOREIGN PATENT DOCUMENTS

CA        2506924 C * 7/2012 ........... B23B 47/287

*Primary Examiner* — Alan Snyder
*Assistant Examiner* — Yasir A Diab
(74) *Attorney, Agent, or Firm* — Michael Best & Friedrich LLP

(57) ABSTRACT

A pocket hole jig for locating pocket holes in a workpiece includes a base with a base plate and first and second side walls extending along the base plate, and a body disposed between the first and second side walls and slidable along the base in a forward direction and a rearward direction. The body includes a drill bit aperture angled downward toward the base plate. The pocket hole jig also includes a fastener configured to releasably couple the pocket hole jig to an adjacent second pocket hole jig.

19 Claims, 6 Drawing Sheets

(56) References Cited

U.S. PATENT DOCUMENTS

| | | | | |
|---|---|---|---|---|
| 5,791,835 A | * | 8/1998 | Chiang | B23B 47/287 |
| | | | | 408/103 |
| 5,971,379 A | | 10/1999 | Leon, Jr. | |
| 6,047,827 A | * | 4/2000 | Huang | B25G 1/005 |
| | | | | 206/349 |
| 6,382,482 B1 | | 5/2002 | Chao | |
| 7,793,900 B2 | | 9/2010 | Feng et al. | |
| 7,802,680 B2 | | 9/2010 | Krebs et al. | |
| RE44,289 E | | 6/2013 | Park | |
| 8,967,562 B1 | | 3/2015 | Bileth | |
| 9,315,321 B2 | | 4/2016 | Browne et al. | |
| 2002/0066988 A1 | | 6/2002 | Couture | |
| 2005/0089381 A1 | * | 4/2005 | Liu | B23B 47/287 |
| | | | | 408/115 R |
| 2006/0228180 A1 | * | 10/2006 | Sommerfeld | B23B 47/287 |
| | | | | 408/115 R |
| 2007/0201961 A1 | * | 8/2007 | Chiang | B23B 47/287 |
| | | | | 408/115 R |
| 2007/0280797 A1 | * | 12/2007 | McDaniel | B23B 47/287 |
| | | | | 408/115 R |
| 2008/0099101 A1 | * | 5/2008 | Chiang | B23B 47/287 |
| | | | | 144/2.1 |
| 2009/0053003 A1 | * | 2/2009 | Clark | B23B 47/287 |
| | | | | 408/103 |
| 2009/0282759 A1 | | 11/2009 | Porter | |
| 2011/0150587 A1 | * | 6/2011 | Stukuls | B23B 39/161 |
| | | | | 408/44 |
| 2011/0303808 A1 | | 12/2011 | Bileth | |
| 2014/0341665 A1 | | 11/2014 | Clark | |
| 2015/0183581 A1 | | 7/2015 | Worsley | |
| 2015/0367424 A1 | * | 12/2015 | Obermeier | B23B 49/02 |
| | | | | 408/1 R |
| 2016/0356145 A1 | | 12/2016 | Andreychuk | |

* cited by examiner

POCKET HOLE JIG

CROSS-REFERENCE TO RELATED APPLICATIONS

This application claims priority to U.S. Provisional Patent Application No. 62/453,089, filed on Feb. 1, 2017, the entire content of which is incorporated herein by reference.

FIELD OF THE INVENTION

The present invention relates to pocket hole jigs.

BACKGROUND OF THE INVENTION

It is often desirable to drill two or more pocket holes in a workpiece. It can be difficult and time consuming to drill two adjacent holes separated by a predetermined distance using a single pocket hole jig.

SUMMARY OF THE INVENTION

The present invention provides, in one aspect, a pocket hole jig for locating pocket holes in a workpiece. The pocket hole jig includes a base with a base plate and first and second side walls extending along the base plate, and a body disposed between the first and second side walls and slidable along the base in a forward direction and a rearward direction. The body includes a drill bit aperture angled downward toward the base plate. The pocket hole jig also includes a fastener configured to releasably couple the pocket hole jig to an adjacent second pocket hole jig.

The present invention provides, in another aspect, a pocket hole jig assembly for locating pocket holes in a workpiece. The pocket hole jig assembly includes a first pocket hole jig having a first base with first and second side walls, a first body disposed between the first and second side walls, the first body including a first drill bit aperture angled downward toward the first base, and a first fastener located on the second side wall. The pocket hole jig assembly further includes a second pocket hole jig having a second base with third and fourth side walls, a second body disposed between the third and fourth side walls, the second body including a second drill bit aperture angled downward toward the second base, and a second fastener located on the third side wall. The first fastener is engageable with the second fastener to releasably couple the first pocket hole jig to the second pocket hole jig with the first base adjacent the second base.

The present invention provides, in another aspect, a method of releasably coupling a first pocket hole jig to a second pocket hole jig. The first pocket hole jig includes a first base supporting a first body movable relative to the first base, and the second pocket hole jig includes a second base supporting a second body movable relative to the second base. Each of the first and second bodies has a downwardly angled drill bit aperture. The method includes positioning the first base adjacent the second base and aligning a first fastener on the first base with a second fastener on the second base. The method also includes engaging the first fastener with the second fastener.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
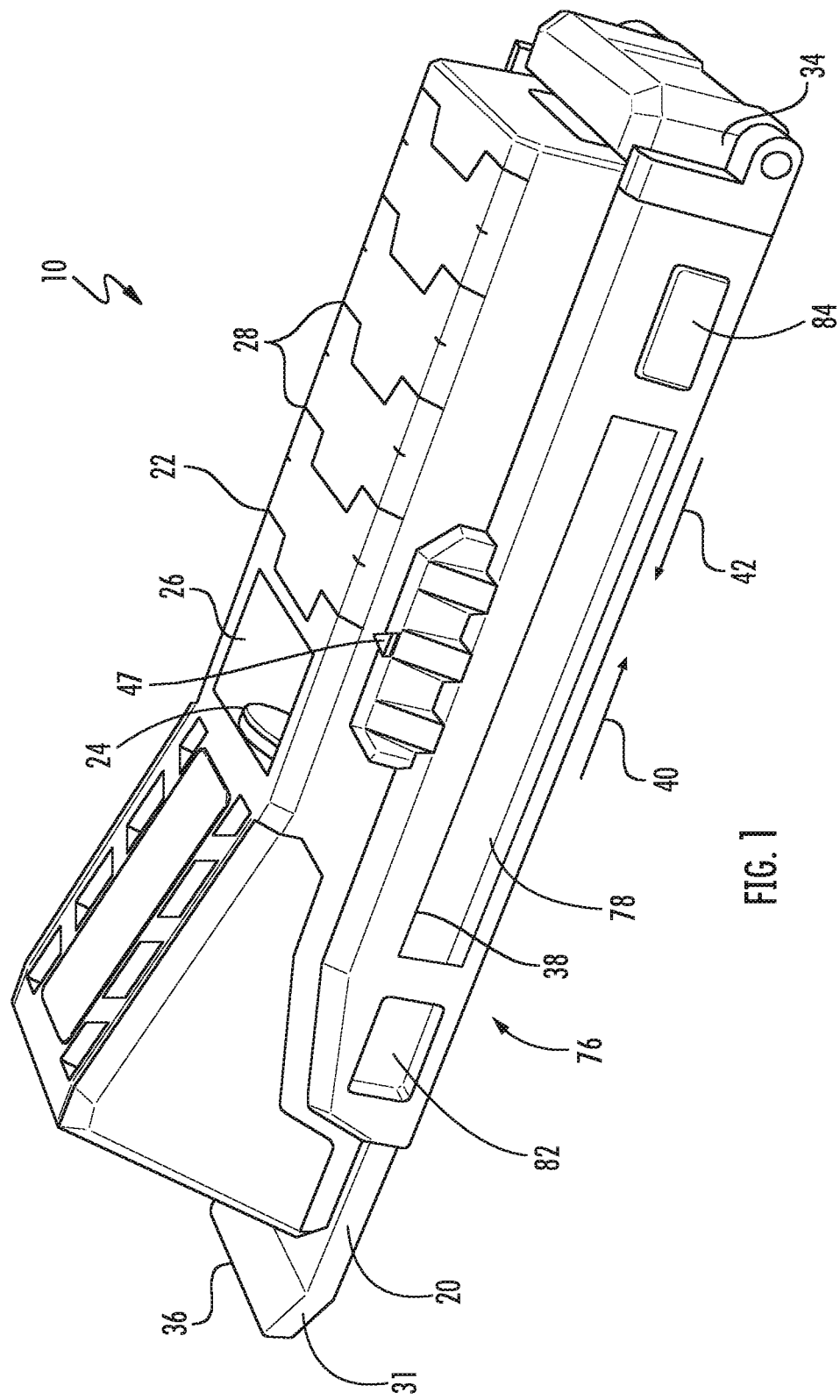
FIG. 1 is a perspective view of a pocket hole jig according to an embodiment of the invention.
Figure 6:
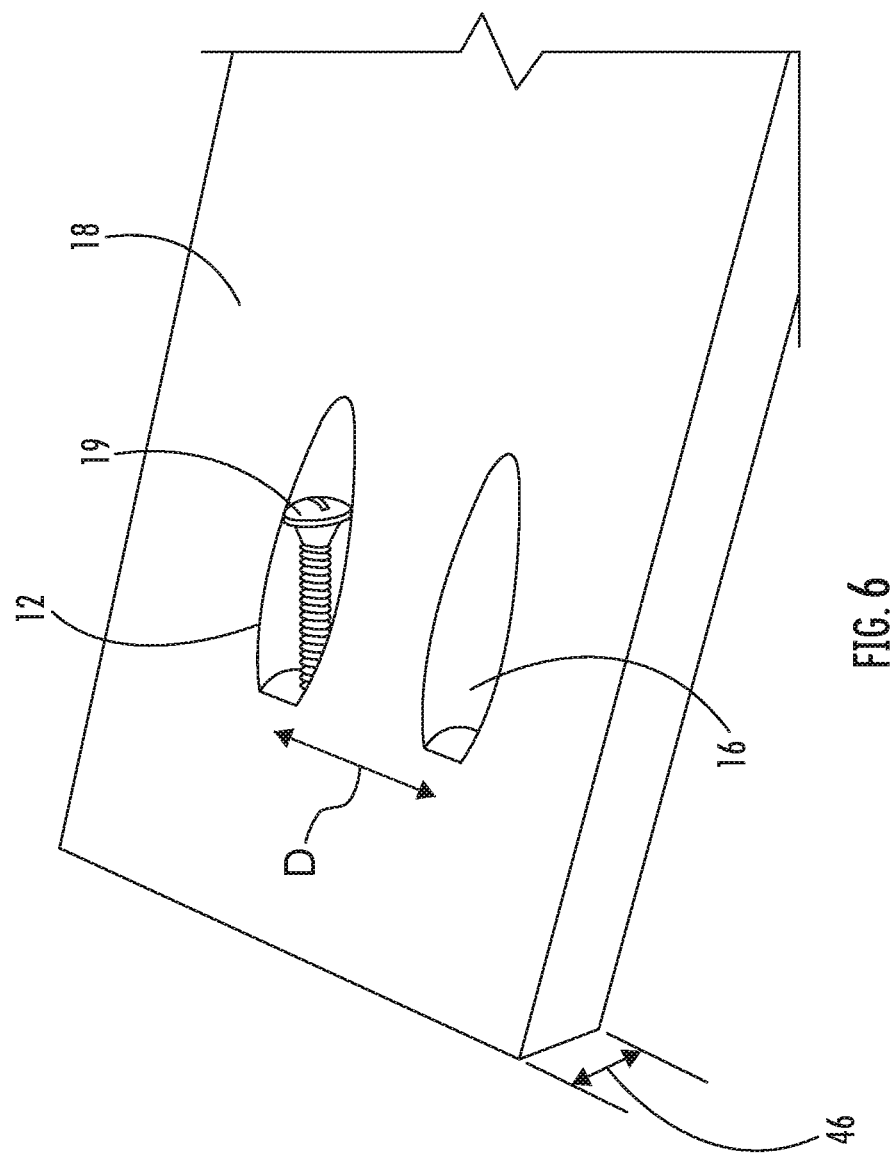
FIG. 6 is a perspective view of a first workpiece including pocket holes formed using the pocket hole jig of FIG. 1.

FIG. 1 is a perspective view of a pocket hole jig 10. Referring to FIG. 6, the jig 10 is used to properly locate pocket holes 12, 16 in a workpiece 18, such as a piece of wood. The holes 12, 16 each receive a pocket screw 19 that is used to attach the workpiece 18 to a second workpiece.

Figure 3:
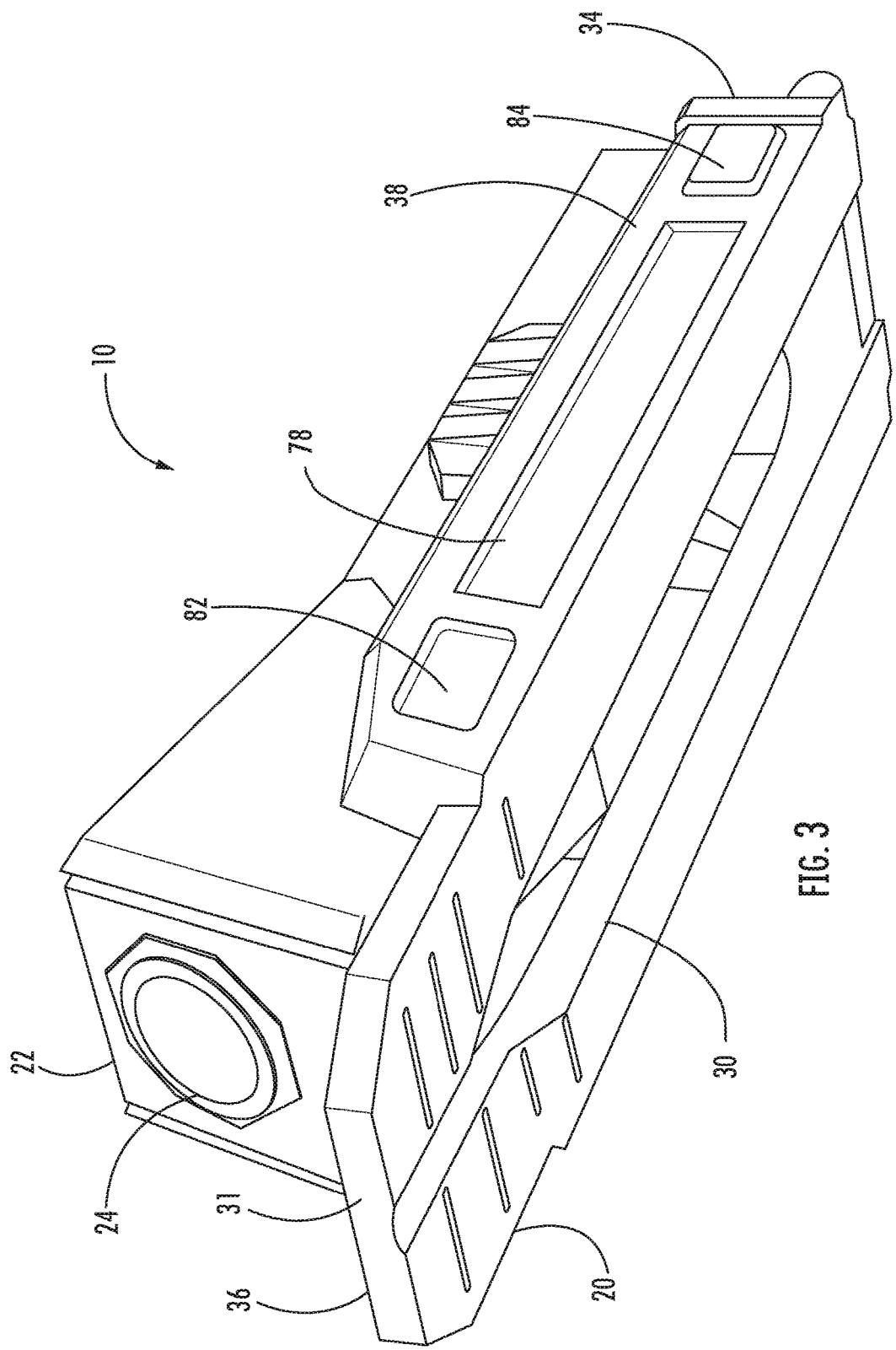
FIG. 3 is another perspective view of the pocket hole jig of FIG. 1.

Referring to FIG. 1, the jig 10 includes a base 20 and a body 22 movable relative to the base 20. The body 22 includes a drill bit aperture 24 (FIG. 3), a window 26, and indicia 28. The aperture 24 is angled downwardly toward the base 20 at an oblique angle and is shaped and sized to receive and guide a drill bit. When a drill bit is inserted through the aperture 24, the bit extends through an aperture 30 (FIG. 3) in the base 20 to drill into the workpiece 18. The window 26 is provided so that a user can see the drill bit traveling through the aperture 24 and into the workpiece and so that debris (e.g., wood chips) created by the drill bit can exit the jig 10. The aperture 30 and the window 26 are in communication with, or intersect, the drill bit aperture 24.

The base 20 includes a base plate 31 and a generally U-shaped front wall 34 extending upward from the base plate 31. The front wall 34 defines a forwardmost or front surface of the base 20. A back end 36 of the base 20 does not include a wall, such that the back end 36 is open. Lateral side walls 38, 39 extend upward from the base plate 31, from the front wall 34 toward the back end 36.

The body 22 is disposed between the lateral side walls 38, 39 such that the body 22 can slide forward (i.e. in the direction of arrow 40) and rearward (i.e. in the direction of arrow 42) relative to the base 20 (FIG. 1). Forward movement of the body 22 is limited by the front wall 34, while the open back end 36 permits the body 22 to be completely withdrawn from the base 20. In some embodiments, a retaining member (e.g., a projection) may limit rearward movement of the body 22 to prevent the body from being separated from the base 20.

Friction between the base 20 and body 22 holds the body 22 in position relative to the base 20 until the user exerts sufficient force to slide the body 22. In some embodiments, the body 22 may include a projection or projections and the base 20 may include a series of recesses that receive the projection(s) to releasably hold the body 22 in the desired position relative to the base 20. The side walls 38, 39 each include a marking 47 (e.g., an arrow in illustrated embodiment). The marking 47 and indicia 28 of the body 22 indicate to the user the relative position of the body 22 relative to the base 20. The indicia 28 include a plurality of lines that each correspond to a particular thickness 46 (FIG.

6) of the workpiece 18 (e.g., ¾ inch, 1 inch, 1¼ inch, etc.). That is, the user can position the body 22 relative to the base 20 by aligning the arrow 47 to the indicia 28 that corresponds to the thickness 46 of the workpiece 18.

Figure 2:
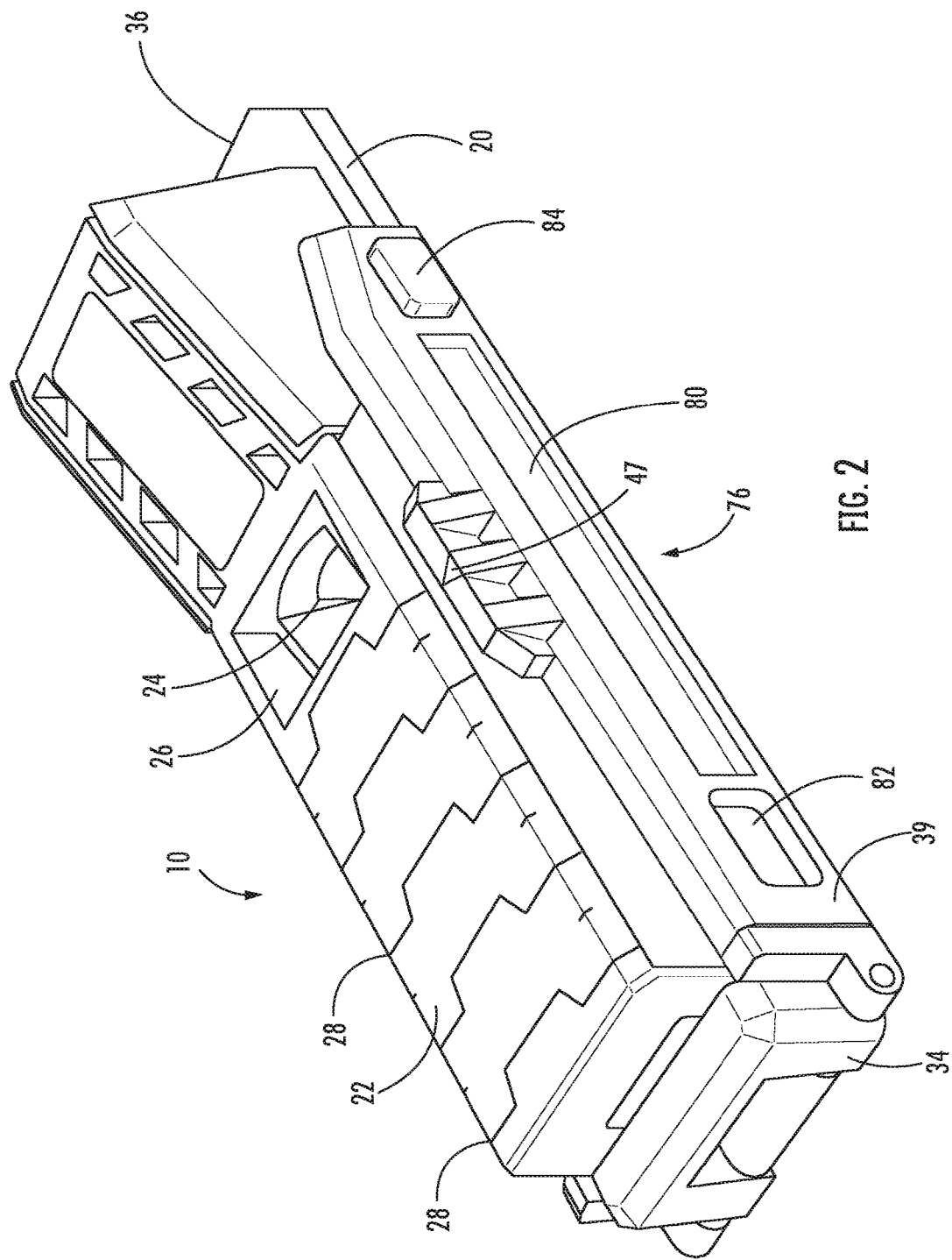
FIG. 2 is another perspective view of the pocket hole jig of FIG. 1.
Figure 4:
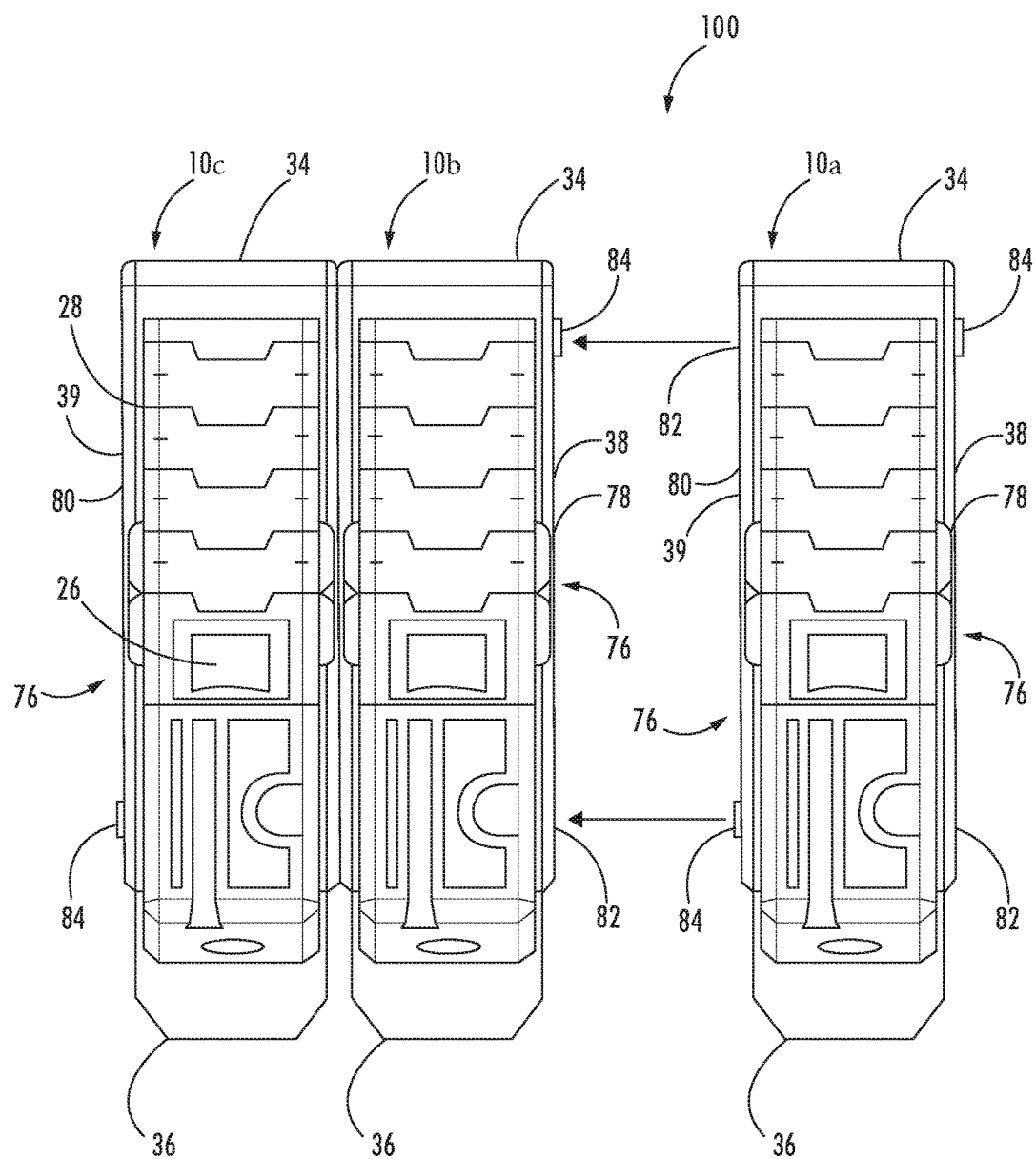
FIG. 4 is a top view of multiple pocket hole jigs of FIG. 1, forming a pocket hole jig assembly.

Referring to FIGS. 1 and 2, the base 20 further includes fasteners 76 on each side wall 38, 39 to couple the jig 10 to other jigs 10 (FIG. 4). In the illustrated embodiment the fastener 76 of the first side 38 includes a ferromagnetic portion or metal strip 78, a recess 82, and a projection 84. The illustrated fastener 76 of the second side 39 includes a magnet 80, a recess 82, and a projection 84. The size and shape of each recess 82 corresponds with the size and shape of each projection 84. In some embodiments, the positions of the recesses 82 and projections 84 may be reversed. In some embodiments, the first side 38 may include the magnet 80, and the second side 39 may include the metal strip 78. In other embodiments, other suitable types of fasteners can be used to releaseably couple the jig 10 to adjacent jigs.

Figure 5:
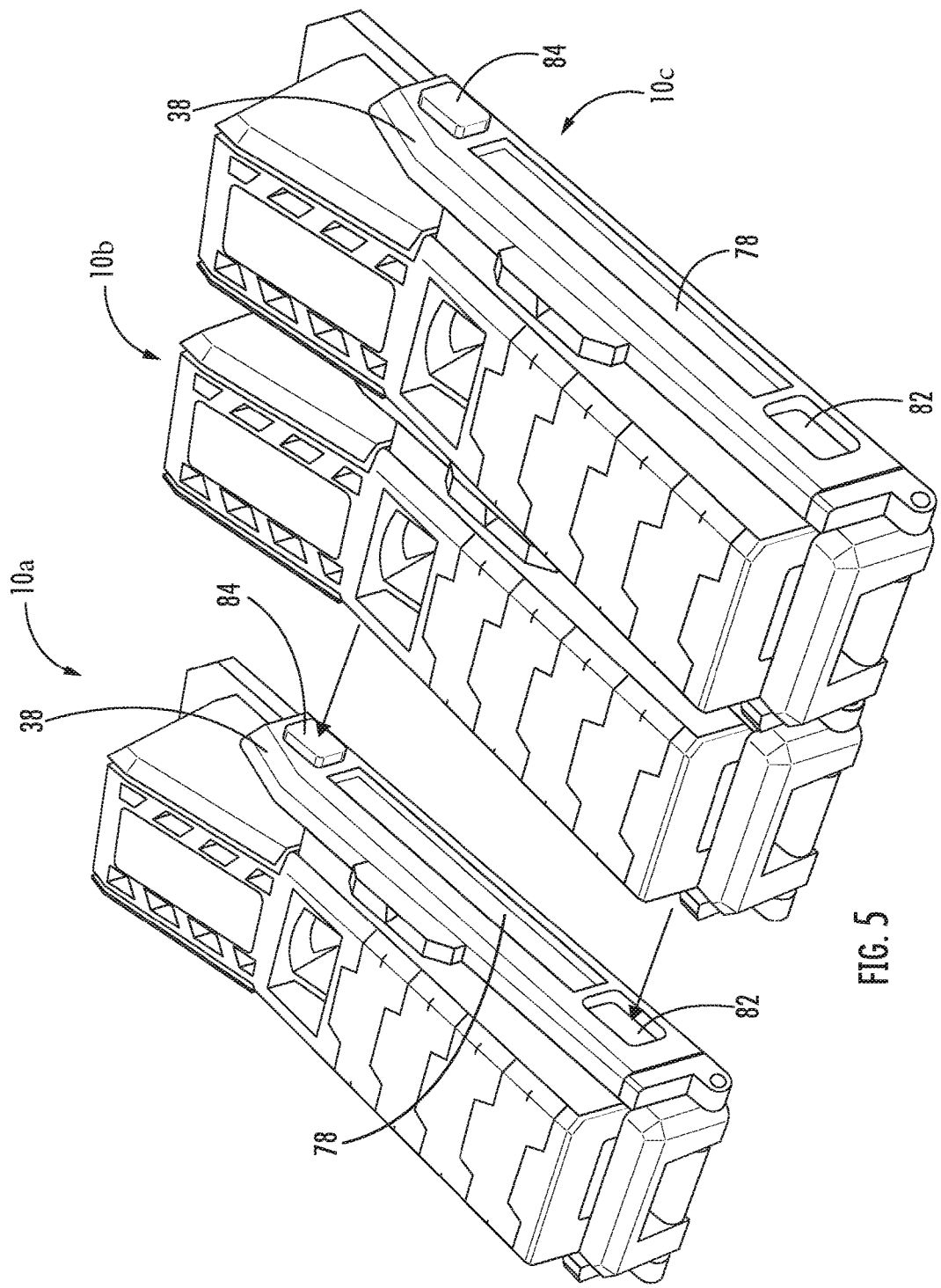
FIG. 5 is a perspective view of the pocket hole jig assembly of FIG. 4.

Referring to FIGS. 4 and 5, multiple jigs 10 (i.e. a first jig 110a, a second jig 10b, and a third jig 10c) can be releasably coupled together via the fasteners 76 to form a pocket hole jig assembly 100. That is, the metal strip 78 of the first jig 10a is placed adjacent the magnet 80 of a second jig 10b to magnetically couple the first jig 10a to the second jig 10b. Meanwhile, the recesses 82 receive and engage the adjacent projections 84 to properly align the jigs 10a, 10b relative to each other. As illustrated in FIGS. 4 and 5, two, three, or more jigs 10a, 10b, 10c can be connected. For example, the first jig 10a can be coupled to the second jig 10b with the base 20 and particularly the first side wall 38 of the second jig 10b positioned adjacent the base 20 and particularly the second side wall 39 of the first jig 10a. The third jig 10c can be coupled to the second jig 10b with the base 20 and particularly the first side wall 38 of the third jig 10c positioned adjacent the base 20 and particularly the second side wall 39 of the second jig 10b. Thus, the second jig 10b can be positioned between the first jig 10a and the third jig 10c. It should be understood that the jigs 10a, 10b, 10c can be coupled together in a variety of different relative positions.

As illustrated in FIG. 6, it is often desirable to drill two or more pocket holes 12, 16 in the workpiece 18. The fasteners 76 of the jigs 10 allow the user to quickly and easily couple multiple jigs 10 to properly and neatly align multiple pocket holes 12, 16 at a predetermined spacing D.

Various features of the invention are set forth in the following claims.

What is claimed is:

1. A pocket hole jig for locating pocket holes in a workpiece, the pocket hole jig comprising:
   a base including a base plate and first and second side walls extending along the base plate;
   a body disposed between the first and second side walls and slidable along the base in a forward direction and a rearward direction, the body including a drill bit aperture angled downward toward the base plate; and
   a fastener configured to cause the pocket hole jig to releasably couple to an adjacent second pocket hole jig, automatically, upon placement of the pocket hole jig a minimum distance away from the second pocket hole jig.

2. The pocket hole jig of claim 1, wherein the body includes a window in communication with the drill bit aperture.

3. The pocket hole jig of claim 1, wherein the base includes a base aperture extending through the base plate and in communication with the drill bit aperture.

4. The pocket hole jig of claim 1, wherein the body is slideable rearward past an open back end of the base.

5. The pocket hole jig of claim 1, wherein the fastener includes a recess and a projection spaced from the recess.

6. The pocket hole jig of claim 1,
   wherein the fastener is a first fastener located on the first side wall, and
   wherein the pocket hole jig further comprises a second fastener located on the second side wall.

7. The pocket hole jig of claim 6,
   wherein the first fastener is configured to releasably couple the pocket hole jig to the second pocket hole jig when the second pocket hole jig is positioned adjacent the first side wall, and
   wherein the second fastener is configured to releasably couple the pocket hole jig to a third pocket hole jig when the third pocket hole jig is positioned adjacent the second side wall.

8. The pocket hole jig of claim 6,
   wherein the first fastener includes a first projection, a first recess spaced from the first projection, and a ferromagnetic portion disposed between the first projection and the first recess, and
   wherein the second fastener includes a second projection, a second recess spaced from the second projection, and a magnet disposed between the second projection and the second recess.

9. The pocket hole jig of claim 8, wherein a size and shape of the first projection corresponds with a size and shape of the second recess, and wherein a size and shape of the second projection corresponds with a size and shape of the first recess.

10. The pocket hole jig of claim 1, wherein the body includes indicia corresponding to a thickness of the workpiece, wherein at least one of the first side wall and the second side wall includes a marking, and wherein the marking and the indicia together indicate a position of the body relative to the base.

11. The pocket hole jig of claim 1, wherein the fastener is configured to magnetically couple the pocket hole jig to the second pocket hole jig.

12. A pocket hole jig assembly for locating pocket holes in a workpiece, the pocket hole jig assembly comprising:
    a first pocket hole jig including
       a first base with first and second side walls,
       a first body disposed between the first and second side walls, the first body including a first drill bit aperture angled downward toward the first base, and
       a first fastener located on the second side wall; and
    a second pocket hole jig including
       a second base with third and fourth side walls,
       a second body disposed between the third and fourth side walls, the second body including a second drill bit aperture angled downward toward the second base, and
       a second fastener located on the third side wall,
    wherein at least one of the first fastener and the second fastener comprises a magnetically responsive material that causes the first fastener and the second fastener to releasably couple, automatically, upon placement of the first pocket hole jig a minimum distance away from the second pocket hole jig.

13. The pocket hole jig assembly of claim 12, wherein the first fastener includes a first recess and a first projection spaced from the first recess, and wherein the second fastener includes a second recess and a second projection spaced from the second recess.

14. The pocket hole jig assembly of claim 13,
wherein the first fastener includes a magnet disposed between the first projection and the first recess, and
wherein the second fastener includes a ferromagnetic portion disposed between the second projection and the second recess.

15. The pocket hole jig assembly of claim 13, wherein a size and shape of the first projection corresponds with a size and shape of the second recess, and wherein a size and shape of the second projection corresponds with a size and shape of the first recess.

16. The pocket hole jig assembly of claim 12, wherein the second pocket hole jig includes a third fastener located on the fourth side wall, and wherein the pocket hole jig assembly further comprises:
   a third pocket hole jig including
      a third base with fifth and sixth side walls,
      a third body disposed between the fifth and sixth side walls, the third body including a third drill bit aperture angled downward toward the third base, and
      a fourth fastener located on the fifth side wall, and
   wherein the third fastener is engageable with the fourth fastener to releasably couple the third pocket hole jig to the second pocket hole jig with the third base adjacent the second base such that the second pocket hole jig is between the first pocket hole jig and the third pocket hole jig.

17. The pocket hole jig assembly of claim 16, wherein the first fastener, the second fastener, the third fastener, and the fourth fastener each includes a projection, a recess spaced from the projection, and a magnet or a ferromagnetic portion disposed between the projection and the recess.

18. A method of releasably coupling a first pocket hole jig to a second pocket hole jig, the first pocket hole jig including a first base supporting a first body movable relative to the first base, the second pocket hole jig including a second base supporting a second body movable relative to the second base, each of the first and second bodies having a downwardly angled drill bit aperture, the method comprising:
   positioning the first base adjacent the second base and aligning a first fastener on the first base with a second fastener on the second base; and
   moving, via a magnetic force, the first base toward the second base, thereby engaging the first fastener with the second fastener.

19. The method of claim 18, wherein engaging the first fastener with the second fastener includes inserting a projecting portion of the second fastener into a recess of the first fastener.

* * * * *